May 5, 1936.  J. BARTH  2,039,764
RECEPTACLE
Filed March 26, 1934
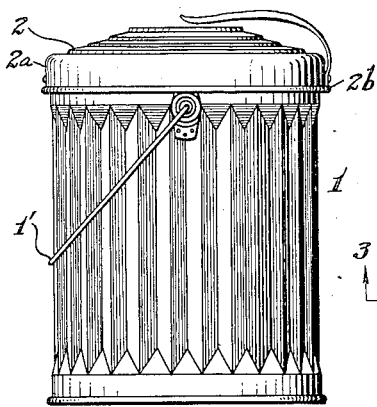
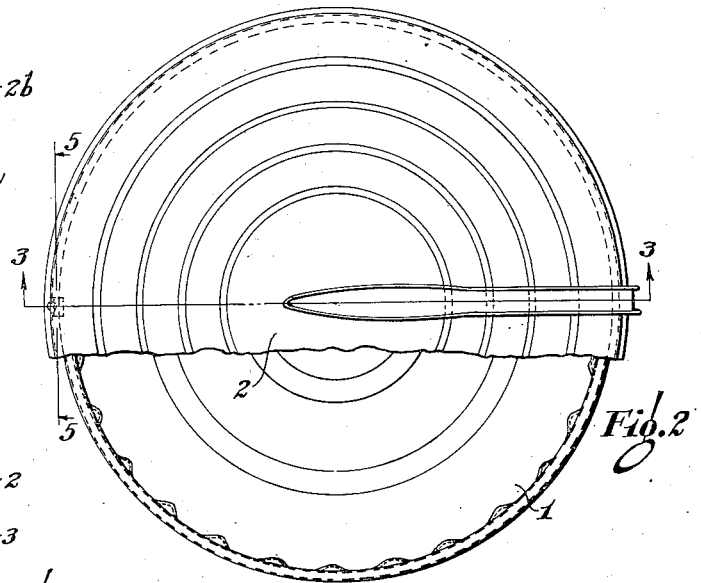
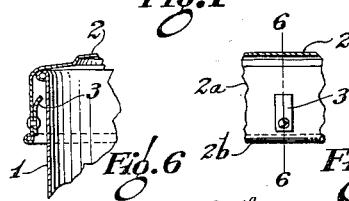
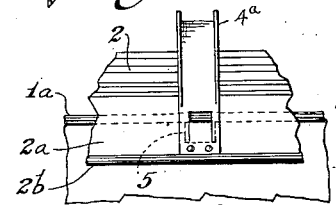
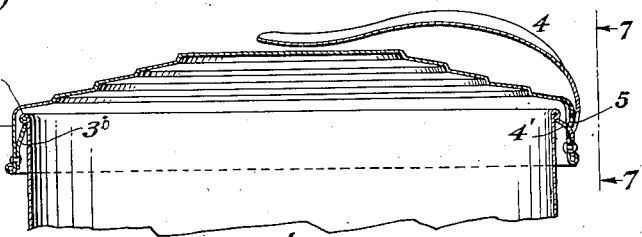
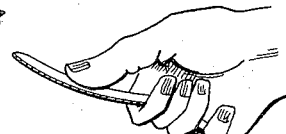
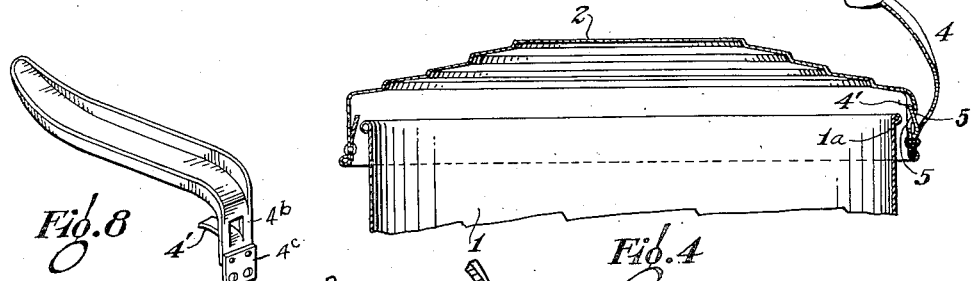
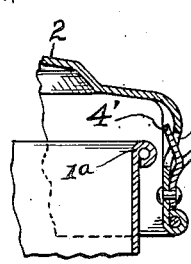
INVENTOR.
John Barth
Geo. B. Pitts
BY ATTORNEY.

Patented May 5, 1936

2,039,764

UNITED STATES PATENT OFFICE 2,039,764

RECEPTACLE

John Barth, Cleveland, Ohio, assignor, by mesne assignments, to The Robar Company Application March 26, 1934, Serial No. 717,448

7 Claims. (Cl. 220—56)

This invention relates to receptacles having a cover carrying self locking means therefor. The present embodiment of the invention is particularly adapted for use in connection with what are commonly known as "garbage cans" where it is desirable to prevent tilting, lifting or removal of the cover either by the force of the wind or by animals.

One object of the invention is to construct a receptacle and a removable cover or lid therefor provided with inter-engaging elements, one of which constitutes an improved handle and lock, adapted to lock the cover in position but arranged, when operated relative thereto, to permit ready removal of the cover by the act of grasping the handle and lifting upwardly.

Another object of the invention is to construct a receptacle and a cover or lid therefor having a locking element movable relatively to the cover to permit removal thereof and normally operative to interlock with the respectacle when the cover is replaced.

Other objects of the invention will be apparent to those skilled in the art to which my invention relates from the following description taken in connection with the accompanying drawing, wherein Fig. 1 is a side elevation of a receptacle and cover having a locking means embodying my invention.

Fig. 2 is an enlarged plan view, with parts broken away.

Fig. 3 is a fragmentary section on the line 3—3 of Fig. 2, showing the position of the cover when attempt is made to elevate it.

Fig. 4 is a view similar to Fig. 3 showing the position of the handle when raised preparatory to removing the cover in the usual manner.

Fig. 4a is a fragmentary section of the parts shown in Fig. 4, enlarged.

Fig. 5 is a fragmentary section on the line 5—5 of Fig. 2, enlarged.

Fig. 6 is a fragmentary section (enlarged) on the line 6—6 of Fig. 5.

Fig. 7 is a fragmentary view on the line 7—7 of Fig. 3.

Fig. 8 is a detail view showing a modification.

The receptacle 1 may be of any suitable and convenient form, said receptacle, in the present instance, comprising the usual cylindrical receptacle or container body and provided around its upper marginal edges with an outwardly extending projection 1a, said projection, in the present instance, comprising the usual outwardly extending bead rim. 1' indicates a bail or handle.

The lid or cover 2 may likewise be of any suitable and convenient form, being provided with a depending rim 2a, adapted to fit over the top of the receptacle or container and preferably provided around its lower or terminating edge with a beaded portion 2b.

As a means of detachably securing one side of the cover 2 to the upper marginal edges of the receptacle 1, one side of the rim 2a is provided internally with a device 3 which, when the cover 2 is on the receptacle 1, is disposed in opposed relation to the side wall or body thereof below the projection 1a, so as to the engage the latter when attempt is made to raise the cover 2 by upward pressure thereon (see Fig. 3); the device 3 is, however, ineffective when an unlocking and lifting means 4, to be later referred to, are first operated as shown in Fig 4. The device 3 preferably compirses a resilient, flat metal strip, the free end portion of which normally flexes inwardly, so that when the cover 2 is positioned it tends to move or slide the cover laterally on the bead 1a, as later set forth. In the form of construction shown in Figs. 1, 2, 3, 4, 5 and 6, the device 3 comprises a vertically disposed resilient metal strip 3b, riveted at its lower end to the internal wall of the rim 2a and extending upwardly, its upper end being free and normally engaging the side wall of the receptacle 1 below the projection 1a when the cover is in position.

The unlocking and lifting means 4, as shown in Figs. 1, 2, 3, 4, 4a and 7 inclusive, comprises a resilient member serving as a lock and release device and as a handle or lifter. In this form of construction the outer or lower end of the member 4 is riveted to the outer face of the cover rim 2a and extends upwardly and then inwardly over a portion of the top of the cover 2, to form a handle. The lower end portion of the member 4, inwardly of its connection with the rim 2a, is provided with an inwardly extending lock element 4'. As the member 4 is formed of resilient metal it tends to swing inwardly, but it is bent or flexed at a point adjacent its secured end when the handle is grasped and upward pull is applied thereto.

In its normal position, with the cover 2 on the receptacle 1, the lock element 4' extends through an opening 5 formed in the rim with its free end disposed below and in operative relation to the projection 1a; in such position the free end of the element 4' may yieldingly engage the side wall of the receptacle 1, below the projection 1a; accordingly, if force is applied to the cover 2 in an upward direction at one or more points about its circumference, the element 4' and co-operating device 3 will engage the projection 1a, as shown in Fig. 3, and prevent removal of the cover. However, when the handle of the member 4 is grasped and upward pull applied thereto, said member will flex or bend at a point adjacent its fixed end and swing outwardly, the effect of which is to move the lock element 4' away from the side wall or body of the receptacle 1, that is, beyond the projection 1a, so that if the upward pull is continued with slight movement toward the remote side of the cover 2, it may be removed from the receptacle 1.

As shown in Fig. 7, the device 4 is riveted to the rim 2a below the opening 5. The device 4 is reinforced throughout its outer portion, such reinforcement being arranged so that flexing will take place adjacent the fixed end of the device, below the lock element 4'. The reinforcement preferably consists in bending such outer portion laterally along either or both side edges as shown at 4a. The lock element 4' is preferably provided by slitting the metal of the device to form a lip or tab and bending the free end of the latter inwardly.

Fig. 8 illustrates a modification of the combined handle and lock device. In this form of construction the upper portion 4b of the device is made of non-resilient metal. To provide for the operation of such portion, I provide on its lower end a section of resilient metal 4c, which is suitably fixed (as by rivets) at its free end to the cover rim, as already described, and suitably fixed (as by rivets) at its inner end to the portion 4b, such section normally serving to maintain the portion 4b with the element 4' in operative relation to the projection 1a but allowing the portion 4b and element 4' to swing outwardly to release the cover.

By preference, the lock element 4' is of such length that it engages the inner face of the rim 2a above the opening 5. The rim therefore serves as a stop to limit the swinging movement of the member 4 and lock element 4'.

From the foregoing description it will be noted that I provide a member which normally swings in one direction and carries an element that is normally in operative relation to the adjacent portion of the bead 1a so that the cover becomes automatically locked to the receptacle when positioned thereon. Furthermore, since the device 4 as shown in Figs. 1 to 8, is held in operative position by reason of its resiliency, the element carried thereby will operate to lock the cover should the latter be turned over on its side and while in such position rolled (which may be effected by wind or an animal). It will also be noted that my construction is relatively simple in that it comprises but a single part, is easily made and is readily operated.

By preference, the device 3 and member 4 are disposed in diametrical relation and are co-operative to lock the cover 2 on the receptacle 1, when upward pressure is applied to the cover in a direction substantially axially of the receptacle or at one side of the cover intermediate the device 3 and member 4.

It will be noted that after the member 4 is initially raised to release the latch 4a from the bead 1a, the cover 2 may be swung about an axis disposed adjacent the diametrical opposite portion of the receptacle 1. From this it will be apparent that the connection for the cover at that side thereof opposite the member 4 may be in the form of a typical hinge instead of a detachable connection or one that is effected by engagement or disengagement such as herein shown.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In a receptacle, the combination of a body having a projection at its upper end, a cover having a depending rim fitting said body, said rim being formed with an opening, and co-operating locking elements, one carried by the inner wall of said rim and arranged below said projection when the cover is in position and the other consisting of a member having a resilient end portion fixedly connected to said cover rim adjacent said opening and carrying inwardly of said end portion a device extending through said opening to dispose its free end normally below said projection when said cover is in position, said resilient portion permitting said member to swing relative to said cover whereby said device clears said projection to permit removal of the cover, said device being arranged to engage said rim when said member swings relative to the cover to limit the movement of said member.

2. In a receptacle, the combination of a body having a projection at its upper end, a cover having a depending rim fitting said body, said rim being formed with an opening, and co-operating locking elements, one carried by the inner wall of said rim and arranged below said projection when the cover is in position and the other consisting of a member fixedly connected at its outer end to said cover rim below said opening therein and carrying inwardly of said outer end a lock device extending through said opening to dispose its free end below said projection when said cover is in position, said member extending upwardly and inwardly and being resilient whereby said device normally engages the side wall of said body when said cover is in position and by grasping said member and exerting upward pull on it, it will flex to swing said device clear of said projection to permit removal of the cover.

3. In a receptacle, the combination of a body having a projection at its upper end, a cover having a depending rim fitting said body, said rim being formed with an opening, co-operating locking elements, one carried by the inner wall of said rim and arranged below said projection when the cover is in position and the other consisting of a member fixedly connected at its outer end to said cover rim below said opening therein and carrying inwardly of said fixedly connected end a lock device extending through said opening to dispose its free end below said projection when said cover is in position, said member extending upwardly and inwardly and being resilient whereby said device normally engages the side wall of said body when said cover is in position and upward pull on said member, will flex and swing said device clear of said projection to permit removal of the cover, and means for limiting the flexing of said member.

4. In a receptacle, the combination of a body having a projection at its upper end, a cover having a depending rim fitting said body, said rim being formed with an opening, and co-operating locking elements, one carried by the inner wall of said rim and arranged below said projection when the cover is in position and the other consisting of a member having a resilient end portion fixedly connected to said cover rim adjacent said opening and carrying inwardly of said resilient end portion a device extending through said opening to dispose its free end normally below said projection when said cover is in position, said resilient portion permitting said member to swing relative to said cover whereby said device clears said projection to permit removal of the cover.

5. A releasable closure for a receptacle having an outstanding projection at its upper end and a cover with a rim fitting over the upper end of the receptacle, comprising a handle fastened to said rim of the cover and said handle extending upwardly with respect to the rim and cover, said handle having near its fastened end an inwardly extending locking portion normally biased into engagement beneath said projection and extending through said rim, said handle adapted to be swung outwardly from the receptacle to withdraw said locking portion from the projection and release the cover for removal.

6. In combination with a receptacle having an outstanding marginal projection, a cover for the receptacle having a rim extending downwardly about the projection when the cover is closed, said rim having an opening therein, a handle overlying the cover with one end extending downwardly against the rim, securing means connecting the lower end of the handle to said rim, said handle having a locking projection extending inwardly therefrom above said securing means, said locking projection extending through said opening in the rim for engagement with the marginal projection of the receptacle and said handle being adapted to be flexed outwardly to withdraw the locking projection from the receptacle projection and free the cover.

7. A removable closure for a receptacle having an outstanding projection at its upper end, comprising a cover with a rim fitting over the upper end of the receptacle, a member forking upwardly and having a common lower portion which is substantially flat and lies against said rim and is fixedly secured thereto, said forks being resiliently connected with the common portion and one fork being extended to provide a handle for said member and the other fork positioned to lie beneath said projection when the cover is in place and lock the latter against upward movement, there being an opening in said rim, one of said forks passing through said opening from one side of the rim to the other, said handle being adapted to be swung outwardly from the receptacle to withdraw said locking portion from the projection and release the cover for removal.

JOHN BARTH.